US006927668B1

(12) United States Patent
Odle et al.

(10) Patent No.: US 6,927,668 B1
(45) Date of Patent: Aug. 9, 2005

(54) PRINT ACCESS SECURITY SYSTEM

(76) Inventors: Richard Odle, 5336 $2^{nd}$ Rd., Lake Worth, FL (US) 33461; Gary Odle, 14900 Stirrup La., West Palm Beach, FL (US) 33414; Robert E. Henry, 2461 Village Blvd., West Palm Beach, FL (US) 33409; David Coriaty, 144 Cocoplum La., Royal Palm Beach, FL (US) 33411

( * ) Notice: Subject to any disclaimer, the term of this patent is extended or adjusted under 35 U.S.C. 154(b) by 218 days.

(21) Appl. No.: 09/718,530

(22) Filed: Nov. 21, 2000

(51) Int. Cl.[7] .............................................. G05B 19/00
(52) U.S. Cl. .................... 340/5.53; 340/5.52; 340/5.51; 340/5.64; 340/5.61; 340/5.21; 340/5.27; 340/5.2; 340/5.1; 340/426.28; 340/426.36; 382/124
(58) Field of Search .............................. 340/5.53, 5.52, 340/5.61, 5.72, 5.21, 5.27, 5.64

(56) References Cited

U.S. PATENT DOCUMENTS

| 5,325,442 A | * | 6/1994 | Knapp ........................ 382/124 |
| 5,448,659 A |   | 9/1995 | Tsutsui et al. |
| 5,523,746 A | * | 6/1996 | Gallagher .............. 340/825.31 |
| 5,598,474 A | * | 1/1997 | Johnson ...................... 713/186 |
| 5,633,947 A | * | 5/1997 | Sibbald ...................... 382/124 |
| 5,686,765 A |   | 11/1997 | Washington |
| 6,100,811 A | * | 8/2000 | Hsu et al. .............. 340/825.31 |

* cited by examiner

Primary Examiner—Michael Horabik
Assistant Examiner—Vernal Brown
(74) Attorney, Agent, or Firm—McHale & Slavin PA (57) ABSTRACT

A fingerprint enrollment and verification module is connected to the electrical circuit of a vehicle to prevent operation of the vehicle by unauthorized users. The module has a sensor that creates a template of a fingerprint when a finger is placed on the module. The module has a flash memory to store enrolled templates and a verification step. After a fingerprint has been enrolled in the module, any operation of that vehicle is possible only after the user's fingerprint is verified to match the enrolled template.

13 Claims, 3 Drawing Sheets

PRINT ACCESS SECURITY SYSTEM

FIELD OF THE INVENTION

This invention is related to security systems and, particularly, to identity recognition through comparison of an image of a finger and a stored template. The security system may be used to gain entry and to energize the systems of a vehicle.

BACKGROUND OF THE INVENTION

It is generally accepted that vehicles are items considered highly transportable by nature. Vehicles may include cars, trucks, buses, vans, construction equipment, water craft, motorcycles, airplanes, golf carts, snowmobiles, and, generally, anything that is capable of self powered mobility. Common to such vehicles is a key or keys for security of the interior and operation of the systems. However, a key can be used by anyone and is easily duplicated, rendering the security of the vehicle vulnerable to unauthorized use.

Some automobile manufacturers utilize different keys for different functions. For instance, General Motors, for many years, employed one key for unlocking the doors and trunk and a second key for starting the engine. However, anyone who had access to the keys would be able to operate the vehicle. More recently, GM has made a key system that includes a microchip. These keys are extremely difficult to duplicate however, there are specialized vendors authorized to make copies. This program also degrades the security system.

Other security systems are in use. For instance, Ford Motor Company employs a keyless entry system which allows an individual to have a numeric or alphabetic code programmed into the keyless entry and a memory circuit stores the code for activation of the door locks upon entry of a correct code sequence. The code is typically maintained by the manufacturers as well as the local dealer. Thus, access to the code can be obtained by a number of people thereby degrading the efficacy of the system.

Currently, most automobile companies and after market suppliers offer small electronic door openers which cooperate with the electrical system in the auto to unlock doors. These devices are a convenience and may be overridden by a key. As such, these devices do not add any security to the system.

In addition to controlling entry to vehicles, there are devices that will cause the engine to start and remotely operate various other electrical systems in the vehicle. However, for security purposes, these devices usually require a key for entry into the vehicle.

In both the electronic door locking devices and the electronic engine starters, there is a very real risk that the frequency used in the devices may be captured by unauthorized persons using scanners or like devices. Also, these devices and their associated circuits are over-ridden by the use of the key. Therefore, anyone with the frequency code or a key or both can operate the vehicle.

However, what is lacking in the art is a stand alone security system that is hard wired into the vehicle and cannot be duplicated by copying of codes or keys. Further, what is lacking in the prior art is a system that is programmable, only, by the owner or authorized operator of the vehicle without the possibility of unauthorized duplication.

Also what is lacking in the prior art is a mechanism for recognizing and verifying less than perfect fingerprint imprints.

DESCRIPTION OF THE PRIOR ART

U.S. Pat. No. 5,686,765 to Washington teaches a system for preventing unauthorized or unlicenced persons from using an automobile. In one embodiment, the system has a remote component that receives and compares physiological identification entered at the vehicle. If the data match, the ignition system of the vehicle is energized for normal operation. In another embodiment, the operator data is compared to a particular time frame for operation by that operator during specified times. And in another embodiment, the system requires subsequent data input to ensure that the authorized driver remains the current operator. There is also provision for a bar code reader of an encoded driver's licence and/or reading the signal of an electronic tether. The physiological identification data may be generated by a fingerprint reader or an eyeball scan. This requires a scan and a transmission to a remote computer.

U.S. Pat. No. 5,448,659 to Hiroshi teaches the use of a card-shaped waveguide-type image transmission device to scan, read and transmit fingerprint data. Again, the identity input is a fingerprint scan.

The fingerprint scanning technology of these prior art devices produces a representation of the grooves and ridges of the surface of a finger. Therefore, these scans are highly susceptible to errors caused by extraneous matter such as dirt, grease, paint, calluses, etc. on the fingers of the prospective users.

SUMMARY OF THE INVENTION

Accordingly, it is an objective of the instant invention to provide a system to secure any vehicle from operation by an unauthorized user.

It is a further objective of the instant invention to provide a system to identify and authenticate a potential user of a vehicle by fingerprint information. The system is referred to as Fingerprint Enrollment and Verification Module, FEVM.

It is yet another objective of the instant invention to. provide a stand alone system hard wired into the electrical system of a vehicle to authorize and/or control any vehicle function by an operator placing a finger on a sensor.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

The term, "operation," refers to any initiation of any system on a vehicle, to include a range of commands from merely authorizing a system component to perform in a normal manner to energizing the component to perform. For example and not by way of limitation, authorizing door locks to open with a key or electronic device is an operation. Actually opening the door locks is also an operation. Likewise, authorizing engine start with a key and starting the engine are both operations. Use of any of the subsidiary systems of a vehicle, such as, transmission, radio, air conditioner, convertible top, windless, blade, lights, alarm, and the like, is an operation. The FEVM may be installed to enable or disable any operation of a vehicle.

A vehicle, as used in this disclosure, is any mobile conveyance. Most vehicles are self propelled and have an electrical system to operate essential and nonessential components, such as an automobile, truck, boat, airplane, earthmoving equipment, motorcycle, farm equipment including tractors, combines, and military equipment including tanks,. self propelled artillery, armored personnel carriers, to name a few. The FEVM is wired into the electrical system of the vehicle to enable or disable the electrically operated components. Of course, the FEVM would be designed to operate on the same electrical current used in the vehicle into which it is to be installed.

Vehicles that are not self propelled may be affected by the FEVM blocking the source of power to the vehicle. Also, mechanical components may be enabled or disabled by the FEVM, e.g. by use of solenoids.

The FEVM has the capability of storing multiple fingerprint templates so that a number of operators may operate the same vehicle. The FEVM has multiple modes which correspond to different subsystems on the same vehicle and each subsystem may be operated by a different finger of the same operator. For example, a thumb print may unlock the doors of an automobile, an index fingerprint may start the engine, another fingerprint may turn on the cell phone, etc.

Figure 1:
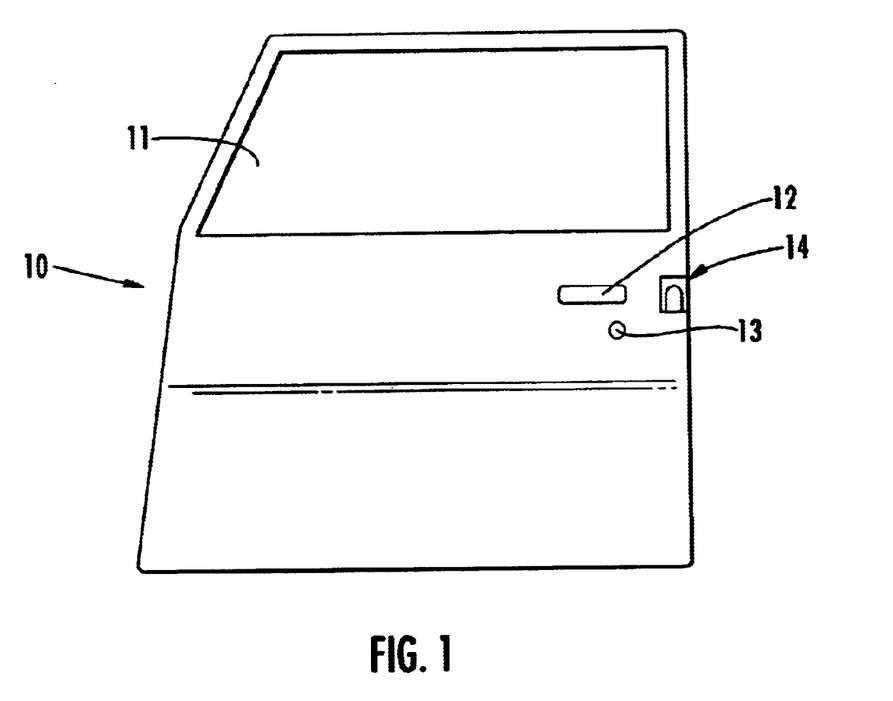
FIG. 1 is a perspective of a door of an automobile.
Figure 2:
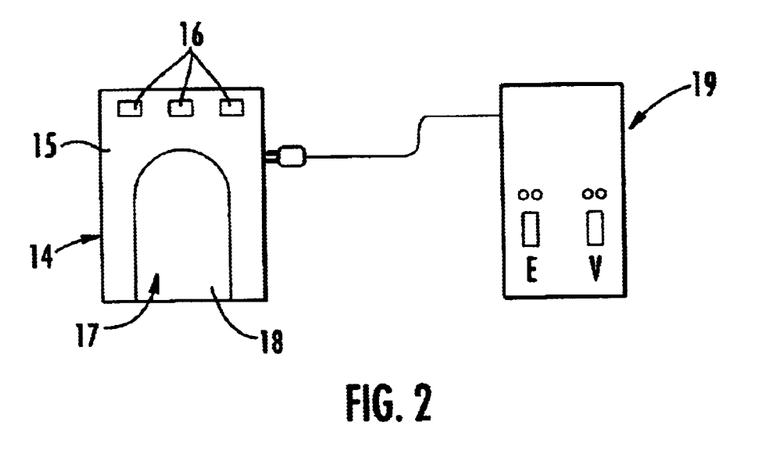
FIG. 2 is a close up perspective of the FEVM housing shown in FIG. 1.
Figure 4:
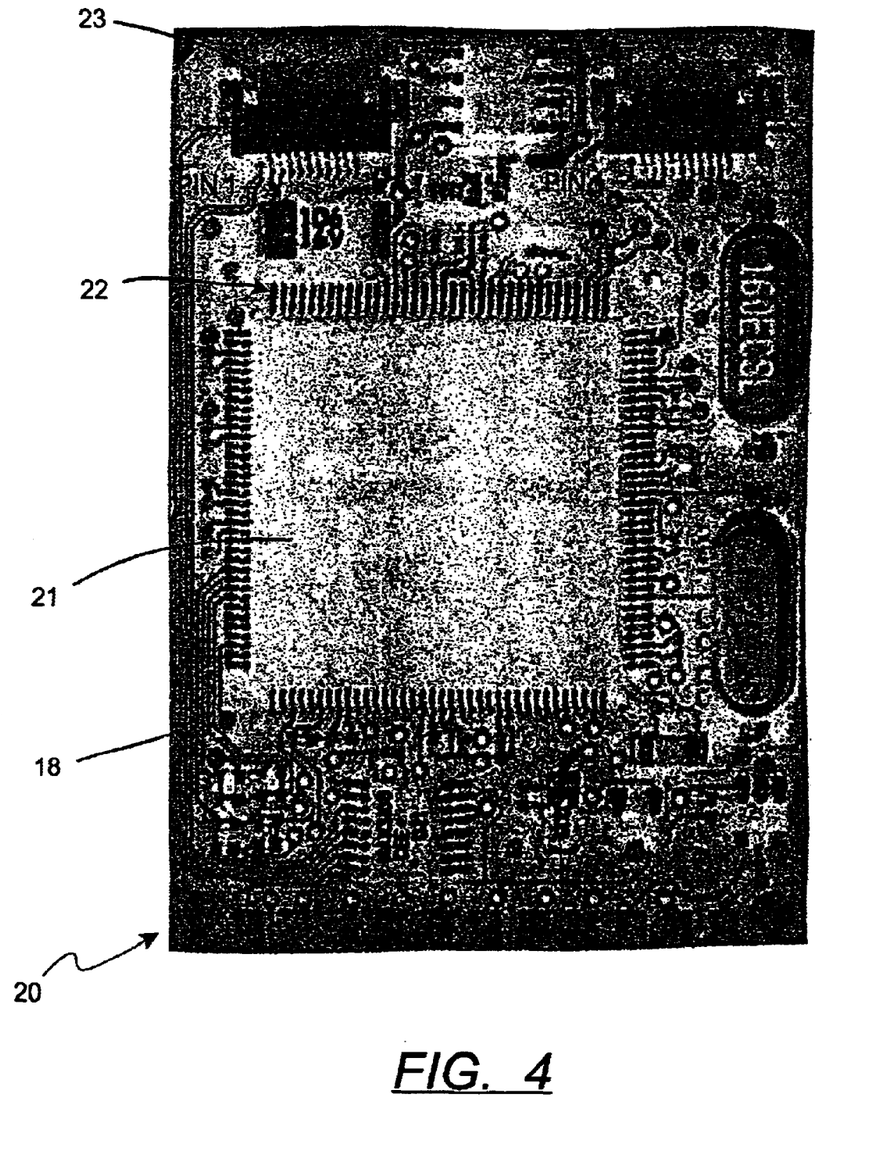
FIG. 4 is a pictural representation of the finger print sensor.

In FIG. 1 an automobile door 10 is shown with a window 11, a door handle 12 and a key lock 13. In one embodiment, the FEVM 14 is mounted in an aperture in the door near the door handle. Another embodiment mounts the sensor 1B and the housing 15 in the door with the sensor connected by wiring to the FEVM 14 located in another part of the vehicle. The FEVM may be mounted at any location on the vehicle as a matter of choice. As shown in FIG. 2, the FEVM 14 has a housing 15 surrounding an aperture in the door (not shown) and connected to the door 10 by screws 16. The housing 15 may be metal or plastic with other connections used, such as welding or adhesives. The housing 15 has an opening 17 of such a shape and size to accommodate the fingerprint of a finger of an operator of the vehicle. A silicone chip sensor 18 is fixed in the housing 15 and extends across the opening 17. The silicone chip is an integral part of a solid state device 20, as shown in. FIG. 4, having an integrated circuit. The sensor surface or matrix 21 contains an active antenna array of more than 16,000 elements and is protected by a hard transparent coating that is scratch and impact resistant. The matrix 21 is surrounded by a drive ring 22 which transmits an extremely small signal that the individual antenna elements can detect. When a,finger is placed on the matrix, the drive ring couples a small signal onto the finger's living subdermal layer. The signal is received by the antenna elements which creates a digital or statistical pattern that reflects the finger's unique underlying structure.

In operation the FEVM is connected to the print access security system programmer 19. The programmer is connected to the FEVM by plug-in connection 23. The programmer is powered by the same voltage as the system into which the FEVM is to be installed. The programmer controls the loading function of the FEVM to enroll an operation for operation of a vehicle.

The programmer 19 is connected to the FEVM and a mode of operation is chosen, then the operator places a finger on the sensor 18. The enroll function of the programmer is activated by pressing the enroll key. The image of the fingerprint on the sensor 18 is processed by the FEVM to form a template of the fingerprint. The template is not a picture or representation of the actual grooves and ridges of a fingerprint. The template is statistical information about the fingerprint image and may be 144 bytes in length. As such, the FEVM does not require a pristine fingerprint to be enrolled but may successfully complete the function when the fingerprint image includes extraneous material, such as perspiration, dirt, paint or grease. When the template is complete, it is stored in the flash memory to complete the enrollment function. An indicator will signal the end of this function. The operator removes his finger from the sensor.

The operator then places the same finger on the sensor a second time and the verify key on the programmer is activated. The FEVM compares the image on the sensor to the template stored in the memory. A signal, such as a green light, will indicate that the image and the template match. The operator is now an authorized user of the mode for which he is verified on the vehicle.

This procedure is repeated for each operator and each mode until complete. The programmer 19 is then unplugged from the FEVM and stored in a secure location. At this point, the FEVM is fully programmed with no electrical or electronic vulnerability. Any physical tampering with the FEVM would merely disable the hardware without invading the software.

Figure 3:
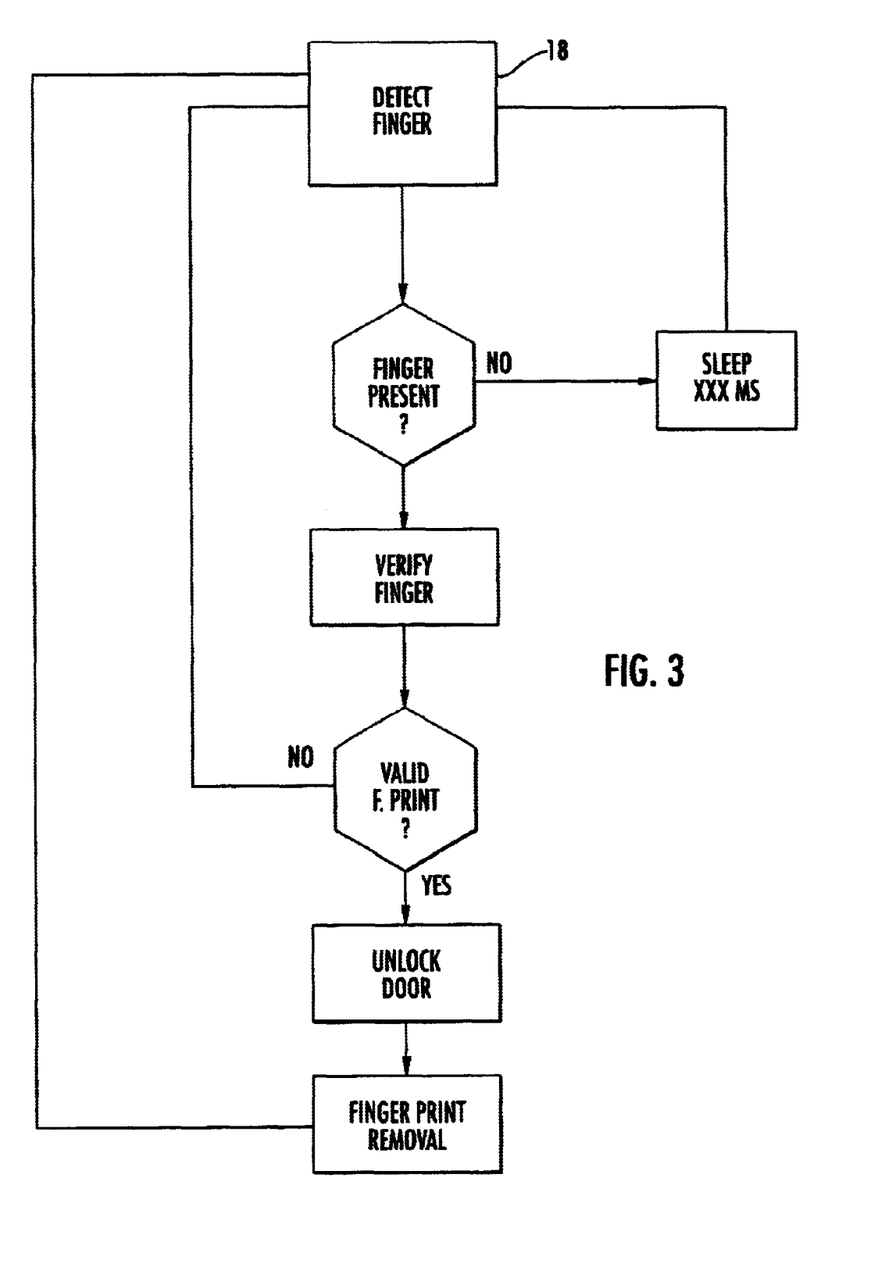
FIG. 3 is a flow chart of the operative steps of the fingerprint enrollment and verification module, FEVM.

FIG. 3 illustrates the steps for opening a door lock using the FEVM. The prospective operator places a finger on the passive sensor 18, the sensor activates and detects the presence of the finger, the fingerprint image is compared to the templates in the flash memory to verify the prospective user. If there is no verification, ie no match in the memory for the prospective operator, the sensor returns to the detect step. If there is a verification and the fingerprint image has a template in the memory, the door unlocks. The finger is removed and the sensor returns to the passive mode.

When the authorized user leaves the car, he again places his finger on the sensor and the doors lock.

A detailed command description of the FEVM follow:

Standalone Fingerprint
  Enrollment
    and
  Verification
    Module
    (FEVM)
    Rev 1.0
  Oct. 28, 2000

Table of Contents

PRINT ACCESS Fingerprint Enrollment and Verification Module
Host Interface Command Set
Command Summary
Basic Concepts
Detailed Command Description
Status
Enroll
Verify Parameters
Verify
Baud Upload
Download
Image
Store
Retrieve
Header
Signature
Erase
Persistent
Calibrate
Priveleges
Restrict
Set Code
Serial Interface Command Features
Power On/Off
Reset
Hardware Signals and Connections
Standalone Connector
Serial Connector Print Access Security Systems Fingerprint Enrollment
and Verification Module
Host Interface Command Set
Copyright Print Access Security Systems, Inc., 2000.

This document describes the host interface command set for the Print Access Security model of Fingerprint Enrollment and Verification Modules. Using these commands, all functionality of the Print Access Security module is exposed to the host CPU. The commands are simple single byte op-codes that are issued through the RS-232 interface. There are two types of commands; immediate and long. Immediate commands return their results immediately. Long commands require an extended length of time to complete. The device status should be polled to determine when such a command has completed or failed.

Command Summary
Command Op-code Description Status 0x00Retrieve the 2 byte device statusEnroll0x01Generate an enrollment template from a finger-Verify0x02Verify a finger against an enrollment template(s)Baud0x03 Set the RS-232 baud rateUpload0x04Send the active enrollment template to the hostDownload0x05Download an enrollment template from host and activateImage0x06Send the enroll Fingerprint image to the hostStore0x07Store the active enroll template in the deviceRetrieve0x08Retrieve an enroll template from the device and activateHeader0x09Return the header from a stored templateSignature0x0AReturn the device signature GEZ6xxrrrErase0x0BErase the specified stored templatePersistent0x0CMake the current settings persistentCalibrate0x0DCalibrate the devicePrivilege0x0EBegin access to privileged commandsRestrict0x0FEnd access to privileged commandsSetCode0x10Set a new privilege codeVerifyParameters0x11Set the verification parameters
Basic Concepts
The basic operation of the FEVM is the Enrollment and Verification of fingerprints. All additional functionality is simply in support of these two key operations.
Enrollment is a process by which a fingerprint image captured by the sensor is transformed into a template. A template may be up to 144 bytes in length and contains statistical information about a particular fingerprint image. This information is sufficient to perform verification when the same—finger is again placed on the sensor. The template is not a fingerprint image.
Verification is a process that applies the statistical information found in an enrolled template against a fingerprint image currently captured by the sensor—No fingerprint image is transmitted outside of the FEVM during verification.

Active Enrollment Buffer: The active enrollment buffer is used to hold an enrollment template. After enrollment it contains the template that has just been enrolled. Prior to verification it should be loaded with the template to be verified. Store and Upload use this Buffer as a source whereas Download and Retrieve use this buffer as a destination.

Storage Slot: A Storage slot is a piece of Flash memory allocated within the FEVM to hold enrolled templates. Enrolled templates may be stored, retrieved or erased from a storage slot.

Detailed Command Description
Status
Op-code: OOH
Type: Immediate
Parameters: None
Returns:
    Byte 1: Command Status
        The bits are described in the following table:
        BitMeaning0St Fail: Previous command failed if set.
1StInEnroll: Performing Enrollment if set.
2StInVerify: Performing Verification if set.
3StInStore: Storing data in Flash Memory if set.
4StInCalibrate: Calibrating if set.
6StPermission: Insufficient permissions.
7StFinger: A finger is placed on the device if set.
    Byte 2: Extended Status
    The extended status byte provides extra status information for a command. This information is command and context dependent.
CommandMeaningVerifyIf Bit 0 is set during verification, then the FEVM is performing verification against the internal storage slots. If Bit 0 is clear during verification, then the FEVM is performing verification against the Active Enrollment Buffer. If verification of multiple storage slots has completed then this status byte contains the verified storage slot number if the verification was successful. EnrollDuring enrollment, the bits for this status byte are defined as follows, Bit Meaning 0 The finger pressure needs adjusting if set. See bits I and 2 for pressure direction. The yellow LED will be on plus one of the green or red LEDs. I If bit 0 is set then too much finger pressure is being applied to the sensor. If bit 0 is cleared then the finger is positioned too far to the left of the sensor. The red LED will be on. (Orientation: LEDs are at the top) 2 If bit 0 is set then too little finger pressure is being applied to the sensor. If bit 0 is clear then the finger is positioned too far to the right of the sensor. The green LED will be on.
Description
Returns the current status of the device. This command may be invoked at any time.
Enroll
Op-code:01H
Type:Long
Parameters: None
Returns: None
Description:
    Initiates enrollment. The command does not complete until a successful enrollment has been achieved. To abort this command the device must be reset. To check for completion of this command, the Status must be polled. The StInEnroll bit will be cleared when this command completes. The host may detect when an individual has placed their finger on the sensor of the device by checking the StFinger bit.

VerifyParameters
Op-code: 11H
Type: Immediate
Parameters:
  Byte 1: The storage slot to begin verification from,
  Byte 2: The number of storage slots to verify. If this byte is 0 then verification is performed on the active enrollment buffer.
Returns: None.
Description:
  This command sunply sets the Verification parameters. Separating the parameters from the Verify command is useful when configuring FEW4s. An application may wish to store multiple templates on an FEVM and then configure it to perform verification on these templates. Forcing verification. is not necessary. E.g. enrolling an individual from a hotel lobby and programming their door lock remotely.
  Note: To make these parameters persistent, the Persistent command should be called prior to the next invocation of reset, The Factory defaults are 0,0.
Verify
Op-code: 02H.
Type: Long
Parameters: None. The parameters are set using the VenfyParameters command.
Returns: None.
Description:
  Initiates verification. The command does not complete until a successful verification has been achieved. To abort this command the device must be reset. To check for the completion of this command, the Status must be polled. The StInVerify bit in the first status byte will be cleared when verification has completed. The host may detect when an individual has placed a finger on the sensor of the device by checking the StFinger bit. The second status byte may be used to detect if a multiple verification or an Active Enrollment Buffer verification is taking place.
Baud
Op-code: 03H
Type: Immediate
Parameters: Byte 1: The new baud rate to be set. Supported Baud rates are as follows:
Baud
RateValue1200024001480029600314,400419,200528, 800638,400757, 6008115,2009
Returns: None.
Description:
Change the communication baud rate for the device to the newly supplied baud rate.
Note: To make the new baud rate persistent, the Persistent command should be called prior to the next invocation of reset The factory default is 3 (9600 baud).
Upload
Op-code: 04H
Type: Immediate
Parameters: None.
Returns: The currently enrolled template in the active enroll buffer. The actual size of the template must be determined by examining the header of the template. The header is the first 2 bytes of the data being returned.

Template Header
BitsDescription0–1Reserved2–3The template structure4–6Template types: 3=84 bytes,4=104 bytes,6=144 bytes Sizes include the header and trailer.7Valid template if clear. Invalid (deleted)if set.8–15Reserved for user data Description:
  Upload the template in the active enrollment buffer to the host.
Download
Op-code. 05H
Type: Immediate
Parameters: A valid template that has been previously uploaded from the device. The size of the download template is determined from the header. (See Upload)
Returns: None. The device status should be checked for failure status.
Description:
  Download a template from the host and store it in the active enrollment buffer. This makes the template available for verification, storage or Upload.
Image
Op-code: 06H
Type: Immediate
Parameters: None
Returns:
Byte 1: The image type id.
0: No image.
1: The next 2 bytes contain the width and height.
Byte 2: The width of the enrollment image in pixels
Byte 3: The height of the enrollment image in pixels
Subsequent Bytes: The enrollment image. This is a black and white image with a bit depth of one.
Description:
  This image may be used to visually inspect the image of the finger that was just enrolled—The most unique features of the finger should be in the center of the image. A good enrollment is necessary for easy verification. This visual inspection is not necessary for enrollment but makes enrollment simpler. An alternative may be to enroll and then verify several times to ensure the quality of the enrolled image.
Store
Op-code: 07H
Type: Long
Parameters:
  Byte1: The internal FEVM slot number to be used to store the active enrollment template. This number must be between 0 and 63.
Returns: None. To check for success or failure of this command, the device status must be polled. Once the StInStore bit has been cleared from the first status byte, the Failed bit will indicate success or failure of this command.
Retrieve
Op-code: 08H
Type: Immediate
Parameters:
  Byte1: The internal FEVM slot number of the enrollment template to be retrieved. This number must be between 0 and 63.
Returns: None. This is an immediate command. The status byte should be checked to determine success or failure.
Description: Retrieve the stored template and place it in the active enrollment buffer. This makes the template available for Verify, Upload or Store.
Header
Op-code: 09H
Type: Immediate
Parameters:
  Byte1: The internal FEVM slot nurnber of the enrollment template to be retrieved. This number must be between 0 and 63.
Returns: The 2 byte header from the stored template. Refer to the Upload command for a description of the header.

Description:
This command is used to recover the header from a stored template. This is useful for applications that may be using the user data component of the header and wish to search through the stored templates to recover this data.
Signature
Op-code: OAH
Type: Immediate
Parameters: None.
Returns: A string representing the signature of the device. The expected return value is "GEZxxxrrr" where "xxx" represents the model of the module and rrr represents the revision. E.g "GEZ6Aa0011" where 6Aa is the model and 001 is the revision.
Description: Returns a device signature string. This command also unlocks the FEVM command engine and must be issued after a reset or power on.
Erase
Op-code: OBH
Type;Long
Parameters:
  Byte1: The internal FEVM slot number of the enrollment template to be erased. This number must be between 0 and 63.
Returns: None. The status of the device should be polled to determine the success or failure of this command. The StInStore bit will be cleared when the command has completed.
Description: Erase the enrolled template stored m the FEVM at the given slot number.
Persistent
Op-code: OCH
Type:Long
Parameters: To help eliminate the possible accidental invocation of this command, the command accepts the op-code (0CH) as the one-byte parameter.
Returns: None. The device status should be polled to determine the success or failure of this command. The StInStore bit will be cleared when the command has completed.
Description: This command will make the current calibration, verification, baud rate and Privilege code settings persistent.
Calibrate
Op-code: ODH
Type,Long
Parameters: None.
Returns: None. The device status should be polled to determine when the calibration has finished. The StInCalibrate bit will be cleared when the command has completed. The newly calibrated values will be made persistent if the Persistent command is invoked.
Description: This command will cause the FEVM to perform calibration. No finger should be present on the FEVM sensor when calibration is being performed.
Note: To make this calibration persistent, the Persistent command should be invoked prior to the next reset.
Privileges
Op-code: OEH
Type: Immediate
Parameters: The Privilege code. This is the code previously set using SetCode. It is 6 bytes long. If a Privilege code has never been set for this device, then the parameter must be set but is ignored.
Returns: None. The device status should be polled to determine if privileges have been granted. The StPrivilege and StFail bits in the status word will be set if the privilege code was invalid Description: If the privilege code that is given matches the privilege code that is currently stored in the FEVM, then permission is granted to perform Image, Download, Persistent, Enroll, Store and Erase.
Note: If no privilege code has been previously set then all privileges are granted without the necessity of calling the Privilege command.
Restrict
Op-code: OFH
Type: Immediate
Parameters: None.
Returns: None.
Description: If privileges are currently active, then this commands disables access to privileged operations thereby disabling Image, Download, Persistent, Enroll, Store and Erase.
Note: If the Privilege code has been made persistent then resetting the device will have the same effect as calling Restrict
SetCode
Op-code:10H
Type: Immediate
Parameters: First 6 bytes: The currently set Privilege code. If no privilege code currently exists, then this parameter should contain 6 bytes of zeroes. Next 6 bytes: The new Privilege code.
Description: Sets a Privilege code for the FEW This privilege code is used with the Privilege command and is used to control access to Image, Download, Persistent, Enroll, Store and Erase.
Note: To make new Privilege code persistent, the Persistent command should be called prior to the next invocation of reset. The factory default is 0x000000000000. Serial Interface Command Features
Power On/Off To power the device off, bring the DTR signal low (0). This will cause power to the device to be dropped down to nominal levels and prevent it from functioning. Bringing DTR high (1) will cause the device to resume operation. All non-persistent setting will have been lost and must be reprogrammed.
Reset
To reset the device, simply toggle the power off and back on using DTR as described above. A delay should be added after power on before the device is fully functional. This delay is approximately 200 ms.
Hardware Signals and Connections
The fingerprint module interface connectors are located on the back of the module (see FIG. 1). Viewing the module from the backside, with the connectors on the top edge, the STANDALONE connector will be on your right side, and the SERIAL connector is on the left side. The connectors are manufactured by Hirose Electric and belong to the FH12 series of 0.5 mm-pitch flex-cable connectors. An appropriate cable to use with these connectors would be Parlex Corporation part#0.5 MM-10-2-B.
CAUTION. All module input signals are rated at 3.3 volts, and they are NOT 5 volttolerant. All module output signals must be buffered if they are required to drive LEDs, etc.
Standalone Connector
The standalone connector allows the FEVM to operate without an additional micro controller. A serial interface will still be required to program the FEVM with templates, Privilege code and verify parameters.
Standalone ConnectorPIN #PIN NAMEDIRECTION**FUNCTION1VCC5VINPUT5 volt supply2GND-power/signal ground3GND-power/signal ground4CTRL-OUT-OUTPUTActive low output indicating verification successful.

When buffered, may be used to drive lock mechanisms, etc. 5PB9-OUTPUTYellow LED active low output.6PB7-OUTPUTRed LED active low output.7PB6-OUTPUTGreen LED active low output. 8PB4-INPUTENROLL user switch control active low9PB5 INPUTVERIFY user switch control—active low10INTA-INPUTSTART user switch control—active low (shared with BOOT mode control—DO NOT use during DSP boot sequence.)** all signal directions are with respect to the fingerprint module (ie. INPUT indicates input for the module)

CAUTION: All module input signals are rated at 3.3 volts, and they are NOT 5 volt tolerant. All module output signals must. be buffered if they are required to drive LEDs, etc.

Functional Description of I/O Signals:

To perform enrollment using the Standalone Connector:

PB,4 should be brought low for at least 20 ms then returned to high. The green LED will be on.

PB5 should be brought low for at least 20 ms then returned to high—The green LED will be off The device will be in enrollment mode. (No LEDs are on)

Place a finger on the sensor.

If PB7 (red LED on) is low and PB9 (yellow LED is off) is high then the finger placed is too far to the left.

If PB6 (green LED on) is low and PB9 (yellow LED is off) is high then the finger placed is too far to the right.

If PB7 is low and PB9 is low then too much pressure is being applied to the sensor (or the finger is too moist).

If PB6 is low and PB9 is low then too little pressure is being applied to the sensor.

Upon successful enrollment PB6 and PB7 are high and PB9 is low (yellow LED is on).

To perform verification using the Standalone Connector:

PB5 should be brought low for at least 20 ms then returned to high.

The device will be in verification mode.

When verification is successful, CTRL—OUT will be made high, otherwise it will remain low. (Future implementation) The green LED will be on.

To cancel either enrollment or verification, INTA should be brought low for at least 20 ms and then returned to high—This will effectively reset all device parameters and return it to monitor mode. Serial Connector The serial connector is used to interface the FEVM with an external CPU. This CPU has access to all the FEVM functionality. Serial Connector PIN#PIN NAME DIRECTIONFUNCTION1VCC5VINPUT5 volt supply2VCC5VINPUT5 volt supply3GND-power/signal ground4GNDpower/signal ground5GND-power/signal ground6CTS-INPUT(reserved) Functionality will change in future revisions. 7RTS-OUTPUT(reserved) Functionality will change future revisions. 8RXINPUTRS-232 serial data input.9TXOUTPUTRS-232 serial data output 10SYS-RESET-INPUTModule reset/power-down. Active low. all signal directions are with respect to the fingerprint module (ie. INPUT indicates input for the module)

CAUTION: All module input signals are rated at 3.3 volts, and they are NOT 5 volt tolerant. All module output signals must be buffered if they are required to drive LEDs, etc.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A print access security system for authorization to operate a vehicle comprising a fingerprint enrollment and verification module, FEVM, adapted for electrical connection to the electrical system of a vehicle, said FEVM having an opening of sufficient size to accept a finger, a sensor means mounted in said opening of said FEVM to receive a finger and generate a statistical pattern of the structure of the finger for authorization to operate the vehicle, said sensor means including a chip having an integrated circuit, said chip having a hard transparent coating on one surface for contacting a finger and a matrix containing an antennae array, said antennae array surrounded by a drive ring adapted to transmit an electrical signal through the subdermal tissue of said finger whereby placing a finger on said coating alters said electrical signal which is received by said antennae array.

2. A print access security system of claim 1 wherein said FEVM has an integral flash memory and a plurality of preselectable modes, one of said modes being an FEVM enrollment mode, said FEVM enrollment mode transforms said first said statistical pattern to a template, said template communicated to an archive destination in said flash memory for saving said fingerprint template.

3. A print access security system of claim 2 wherein said FEVM preselectable modes includes a FEVM verification mode wherein said FEVM applies a current statistical pattern captured by said sensor means to templates in said archive.

4. A print access security system of claim 3 wherein operation of a vehicle is denied by said FEVM when said current statistical pattern does not match any template in said archive.

5. A print access security system of claim 4 wherein operation of a vehicle is permitted by said FEVM when a template in said archive and said current statistical pattern match.

6. A print access security system of claim 4 wherein said vehicle has passenger doors, said FEVM mounted on one of said passenger doors, said FEVM electrically wired into the electrical system of said vehicle, said opening facing outwardly exposing said sensor means.

7. A print access security system of claim 6 wherein said vehicle has an electrical door lock circuit and said passenger doors have electrically powered door locks connected to said electrical door lock circuit, said FEVM is electrically connected to said door lock circuit, said FEVM acting as a switch in said circuit, said switch not activating said circuit, when said template and said statistical pattern do not match.

8. A print access security system of claim 5 wherein said vehicle has passenger doors and an * electrical door lock circuit, said doors including electrically powered door locks connected to said electrical door lock circuit, said FEVM is electrically connected to said door lock circuit, said FEVM acting as a switch in said circuit, said switch activating said circuit when said template and said statistical pattern match.

9. A print access security system of claim 8 wherein said FEVM energizes said door locks and unlocks said doors.

10. A print access security system of claim 3 wherein said FEVM is mounted in said vehicle and said FEVM is electrically wired into the electrical system of said vehicle, said opening facing outwardly exposing said sensor means.

11. A print access security system of claim 10 wherein said vehicle electrical system includes circuits to a multiplicity of subsidiary systems, said FEVM having a plurality of selectable modes corresponding to said circuits, said FEVM connected to each of said circuits, said FEVM acting as a switch in said circuits, said FEVM not activating a corresponding circuit when a particular mode is selected and said template and said current statistical pattern do not match.

12. A print access security system of claim 11 wherein said FEVM activates a corresponding circuit when a particular mode is selected and said current statistical pattern and said template match.

13. A print access security system of claim 12 wherein said FEVM energizes said circuit and operates said subsidiary system.

* * * * *